E. T. LARKIN.
BRAKE MECHANISM.
APPLICATION FILED JULY 27, 1916.

1,246,952.

Patented Nov. 20, 1917
2 SHEETS—SHEET 1.

Inventor
Elwood T. Larkin
by Guyer & Papp
Attorneys

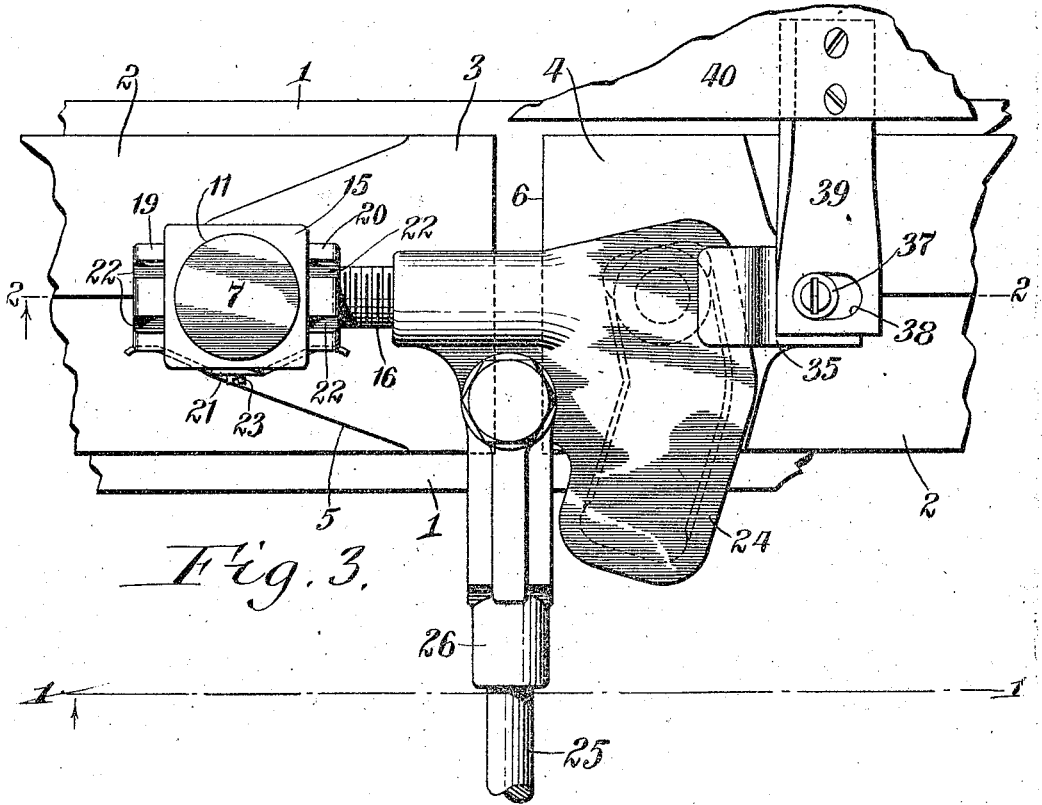
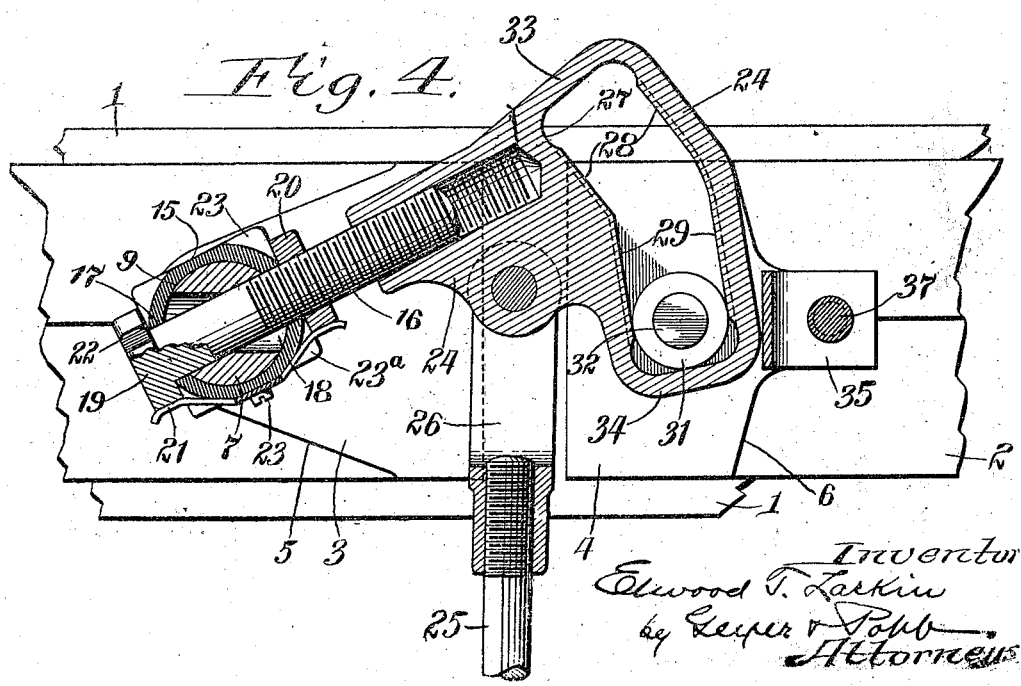

UNITED STATES PATENT OFFICE.

ELWOOD T. LARKIN, OF BUFFALO, NEW YORK, ASSIGNOR TO STERLING ENGINE COMPANY, OF BUFFALO, NEW YORK, A CORPORATION OF NEW YORK.

BRAKE MECHANISM.

1,246,952.    Specification of Letters Patent.    Patented Nov. 20, 1917.

Application filed July 27, 1916. Serial No. 111,744.

*To all whom it may concern:*

Be it known that I, ELWOOD T. LARKIN, a citizen of the United States, residing at Buffalo, in the county of Erie and State of New York, have invented new and useful Improvements in Brake Mechanism, of which the following is a specification.

This invention relates to a brake mechanism of that type having a brake band which surrounds a brake drum and is adapted to be contracted for holding said drum stationary and to be expanded for allowing the drum to freely rotate as desired.

The object of the invention is to provide a simple brake mechanism of this character which is more particularly adapted for use with a reverse gear, in which a certain amount of movement of the actuating parts will cause the brake band to operate but where any further movement of said actuating parts will not cause a further actuation of said brake band.

It is the further object to provide a device of this character which will not depend on any spring action in either the actuating parts or the brake band itself; which will impose a minimum frictional resistance upon operation, which may be readily assembled and adjusted and which may be manufactured at low cost.

Figure 1:
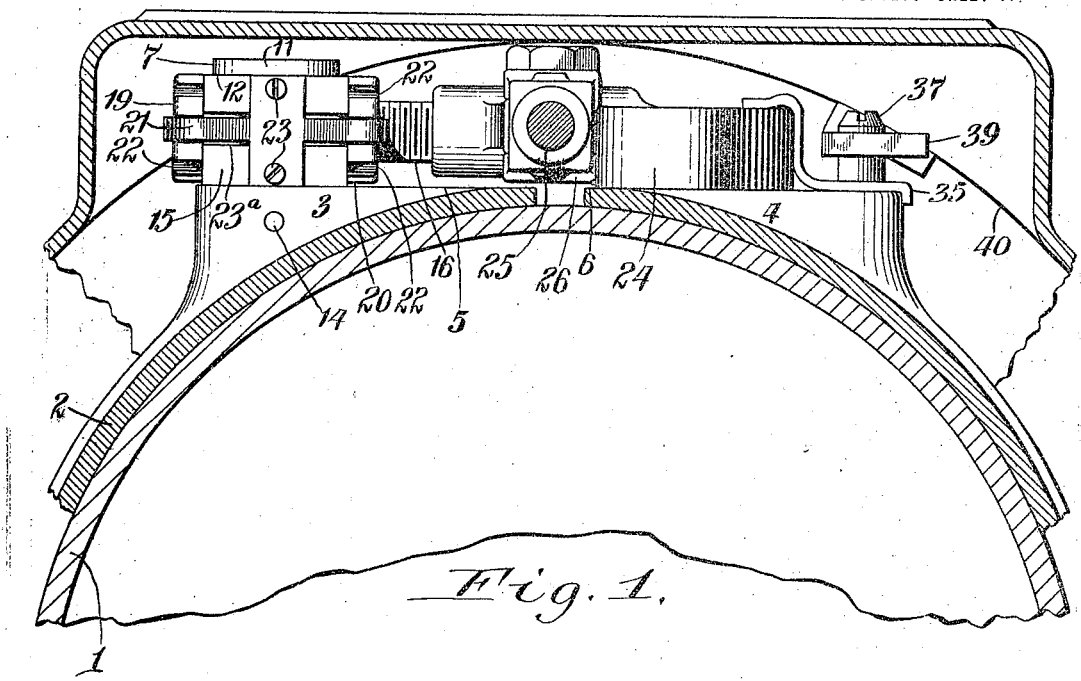
Figure 2:
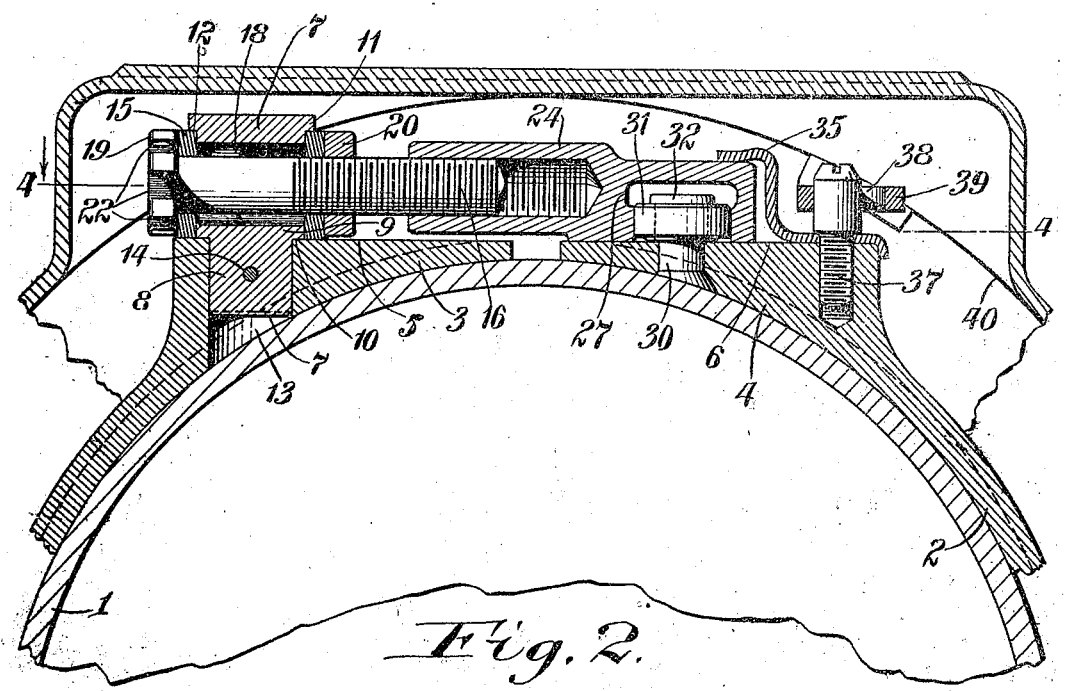

In the accompanying drawings:

Figures 1 and 2 are fragmentary vertical transverse sections of the improved brake mechanism taken on the correspondingly numbered lines in Fig. 3. Fig. 3 is a fragmentary top plan view of the brake mechanism with the casing omitted. Fig. 4 is a fragmentary horizontal longitudinal section taken on line 4—4, Fig. 2.

Similar characters of reference indicate corresponding parts throughout the several views.

1 represents the braking drum which is journaled in any suitable manner, not shown, so as to be capable of rotating around a fixed longitudinal axis. Arranged circumferentially around said drum is the split brake band 2 which, when contracted, will hold the drum stationary but which when expanded will permit said drum to freely rotate. Preferably the brake band is provided adjacent to its opposing ends 3, 4 with upper raised flat faces 5, 6, as illustrated in the drawings.

Mounted on the end 3 of the brake band is an upright pivot post 7 which has a lower reduced cylindrical part or stem 8, an intermediate enlarged part 9 having a cylindrical periphery and forming a downwardly facing external shoulder 10, and an upper laterally projecting flange 11 forming a downwardly projecting external shoulder 12. The stem 8 projects downwardly into a vertical opening 13 in the end 3 of the brake band so that the lower shoulder 10 bears against the flat face 5 thereof and is held in place by a pin 14 passing horizontally through the stem and the adjacent part of the brake band.

On the cylindrical intermediate part of the post is journaled a swivel block 15 which is rotatable horizontally about the vertical axis of this post but is confined against vertical movement by engagement of the underside and upper side of the block with the face 5 of the brake band and the shoulder 12, respectively, of the post, as shown in Fig. 2.

Passing horizontally and transversely through both the swivel block and the post is an adjusting rod or bolt 16, this block being provided on its diametrically opposite sides with suitable round holes 17 equal to the diameter of the bolt so as to cause the bolt and block to both swing about the post in unison. The post, as best shown in Fig. 4, is provided with a diametrical opening 18 which flares from its central part toward its opposite ends so formed to allow the bolt 16 not only to pass through said post but also to allow the same to freely swing horizontally to a limited extent together with the swivel block, within the range of its necessary turning movement. The adjusting bolt 16 has its head 19 at the outer end thereof and bearing against the outer side of the swivel block while its threaded end projects inwardly from the inner side of the swivel block. To prevent this bolt 16 from turning relatively to the swivel block, a lock nut 20 is provided which engages the threaded inner part of the adjusting bolt and bears against the inner face of the swivel block. To further insure holding the lock nut 20 and bolt 16 from becoming loose a nut lock is provided which preferably comprises a double ended locking spring 21 which is secured intermediate of its length to one side of said swivel block and engages its flat portions with said lock nut and the head of the adjusting bolt. Preferably both said nut and the head of the bolt are notched or of castellated form, as shown at 22, so that the ends of the locking spring may be engaged with these notches and reliably interlock the adjusting bolt and its lock nut. The spring 21 may be secured to the swivel block in any suitable manner, for instance by screws 23 passing through its central part. The opposite ends of the detent spring 21 are preferably held against vertical displacement in addition to the screws 23 by means of pairs of lugs $23^a$ arranged on the adjacent part of the swivel block above and below the end portions of said detent spring, as shown in Figs. 1, 3 and 4.

The threaded end of said locking bolt screws into a cam head or member 24, so that, by turning said bolt, said cam member may be moved toward or away from the post upon which it is pivoted. Said cam member is caused to be swung around said post from one position to another by means of an actuating rod 25 secured to a fork 26 whose inner end is pivoted to the cam member. Adjacent to the brake band end 4 this cam member is provided with a downwardly opening cam groove 27 having a pair of inwardly-facing parallel cam faces 28 which are inclined relatively to all radii running through them from the center of the pivot post and also a pair of inwardly facing parallel cam faces 29, which are substantially perpendicular to all radii running through them from the center of said post. Extending upwardly from the upper flat surface 6 of the brake band end 4 and into the cam groove 27 is a stud 30 which is riveted to the band end 4 and serves as a journal for an anti-friction roller 31 whose diameter is approximately equal to the distance between the parallel faces of the two pairs of cam faces 28 and 29, said stud being preferably provided with a suitable head 32 for retaining said roller. If the cam member 24 is turned from the position shown in Fig. 3 to that shown in Fig. 4, the brake band will continue to expand so long as the roller 31 engages the left hand cam face of the pair of parallel cam faces 28, but from the moment that this roller starts to engage one of the parallel inwardly-facing cam faces 29, there will be practically no further movement of the brake band. If the cam member be now moved in the opposite direction, the first part of the movement will not affect the position of the brake band but during the latter part of this movement the brake band will be contracted until the brake drum is tightly gripped and held stationary. This slack motion to the cam faces 29 is necessary to permit of connecting a friction clutch with the same lever which actuates the rod 25, so that power may be directed by the one main lever either through said friction clutch or through such power transmission as is dependent on the action of the brake band and it is made impossible to direct the power through both paths at once.

To limit the turning movement of the cam member, the same is provided with the stop walls 33 and 34 arranged at the opposite ends of the cam groove 27.

It will be noted that the entire actuation of the brake band is absolutely positive, no dependence being placed on any spring return action. It is however more desirable to have the brake band constantly tending to open up, as is the case in ordinary practice, so as to prevent rattling of the actuating parts and besides, this elastic force also avoids any tendency of the ends of the brake band to sway longitudinally one end relatively to the other when the brake band is fully opened and the cam member is at the end of its movement as in the position shown in Fig. 4. In this position, which is the normal running position, the friction roller 31 cannot move longitudinally in one direction due to the transverse end or stop wall 34 and it cannot freely move in the other direction because it would be forced to roll up the face of the right hand member of the parallel cam faces 29, against the said elastic force which tends constantly to open up the brake band. To prevent vertical displacement of the cam member 24 relatively to the companion end of the brake band, a detaining spring 35 is secured by means of a stud screw 37 to the latter which spring extends up and over said cam member and pressing downwardly upon the top flat surface of the same. To prevent longitudinal displacement of the brake band the upper end of said screw 37 also engages a transverse slot 38 which is formed in the outer end of a guide arm 39 secured to the inner side of a stationary casing 40 which incloses the brake band and drum. Thus the end 4 of the brake band while free to move laterally is constrained longitudinally so as to prevent all longitudinal swaying and this indirectly prevents any swaying of the other end 3 of the brake band, so that the grip and release of the brake band is always steady and smooth.

This brake mechanism is readily adjusted and cannot be accidentally thrown out of adjustment; it is strong and simple and its frictional resistance being very low, the action is very powerful and even. It is absolutely mechanically positive, its action being independent of spring action, and it can be manufactured at low cost.

I claim as my invention:

1. A brake mechanism comprising a brake drum, a brake band engaging said drum and having opposing ends, a post secured to one of the band ends and provided with a diametrical opening, a swivel block journaled on said post, a cam member provided with a cam face, an adjusting bolt secured to said cam member and said swivel block and passing through said opening, a projection arranged on the other band end and bearing against said cam face, and means for turning said cam member about said post.

2. A brake mechanism comprising a brake drum, a brake band engaging said drum and having opposing ends, a post secured to one of the band ends and provided with a diametrical opening and cylindrical periphery, a swivel block journaled on the periphery of said post, a cam member provided with a cam face, an adjusting bolt passing through said block and the opening of said post and engaging its threaded end with said cam member while its head bears against one side of said block, an adjusting nut arranged on said bolt and bearing against the other side of said block, a locking spring secured to said block and engaging both the nut and head of said bolt, a projection arranged on the other band end and bearing against said cam face, and means for turning said cam member about said post.

3. A brake mechanism comprising a brake drum, a brake band engaging the drum and having opposing ends, a cam member pivoted to one of said band ends and provided with two cam faces one of which is substantially perpendicular to radii of said cam member, the other of which is inclined to the radii of said cam member, a projection arranged on the other band end and bearing against one or the other of said cam faces, and means for turning the cam member relatively to its pivot.

4. A brake mechanism comprising a brake drum, a brake band engaging the drum and having opposing ends, a cam member pivoted to one of said band ends and provided with two cam faces one of which is substantially perpendicular to radii of said cam member, the other of which is inclined to the radii of said cam member, a projection arranged on the other band end and bearing against one or the other of said cam faces, means for turning the cam member relatively to its pivot, and stops arranged on the cam member at the ends of its cam faces and adapted to bear against said projection to limit the movement of said cam member.

ELWOOD T. LARKIN.